(12) United States Patent
O'Reilly

(10) Patent No.: US 6,535,863 B1
(45) Date of Patent: Mar. 18, 2003

(54) METHOD FOR UTILIZING A KNOWLEDGE-BASED SYSTEM

(75) Inventor: Sean Bogue O'Reilly, Farmington, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/544,317

(22) Filed: Apr. 6, 2000

(51) Int. Cl.[7] .................................................. G06N 5/00
(52) U.S. Cl. .......................................... 706/45; 707/102
(58) Field of Search ............................. 706/45, 11, 46; 707/102

(56) References Cited

U.S. PATENT DOCUMENTS

| | | | |
|---|---|---|---|
| 4,595,982 A | 6/1986 | Burt | 706/46 |
| 4,648,044 A | 3/1987 | Hardy et al. | 706/60 |
| 4,658,370 A | 4/1987 | Erman et al. | 706/60 |
| 4,803,641 A | 2/1989 | Hardy et al. | 706/60 |
| 4,829,426 A | 5/1989 | Burt | 706/45 |
| 4,884,218 A | 11/1989 | Agnew et al. | 706/50 |
| 4,930,071 A | 5/1990 | Tou et al. | 707/4 |
| 4,931,951 A | 6/1990 | Murai et al. | 706/61 |
| 4,965,741 A | 10/1990 | Winchell et al. | 706/11 |
| 5,197,116 A | 3/1993 | Katoh et al. | 706/48 |
| 5,228,116 A | 7/1993 | Harris et al. | 706/50 |
| 5,278,751 A * | 1/1994 | Adiano et al. | 705/10 |
| 5,325,466 A | 6/1994 | Kornacker | 706/61 |
| 5,338,188 A | 8/1994 | Yocum | 432/114 |
| 5,347,614 A | 9/1994 | Yamada et al. | 706/59 |
| 5,414,798 A | 5/1995 | Nigawara et al. | 706/59 |
| 5,418,889 A | 5/1995 | Ito | 706/59 |
| 5,446,885 A | 8/1995 | Moore et al. | 707/103 R |
| 5,504,840 A | 4/1996 | Hiji et al. | 706/61 |
| 5,748,943 A | 5/1998 | Kaepp et al. | 703/1 |
| 5,799,293 A | 8/1998 | Kaepp | 706/45 |
| 6,289,255 B1 * | 9/2001 | Shah et al. | 700/105 |

FOREIGN PATENT DOCUMENTS

EP 0 508 308 A2 4/1992

* cited by examiner

*Primary Examiner*—John A. Follansbee
*Assistant Examiner*—Joseph P. Hirl

(57) ABSTRACT

A method for utilizing a knowledge-based expert or engineering system. The method improves the performance of the system by evaluating how well the system's body of knowledge solves/performs a problem/task and verifying and/or altering the body of knowledge based upon the evaluation.

18 Claims, 1 Drawing Sheet

METHOD FOR UTILIZING A KNOWLEDGE-BASED SYSTEM

FIELD OF THE INVENTION

This invention generally relates to a method for utilizing a knowledge-based system and more particularly, to a method which selectively alters the knowledge within the system based upon an evaluation of the output of the system.

BACKGROUND OF THE INVENTION

Knowledge based expert and/or engineering systems are used to provide answers to technical or engineering problems and/or to perform tasks which are inputted into the systems. For example and without limitation, knowledge-based systems are used in the design, evaluation and development of products such as automotive vehicles, systems and components. Particularly, knowledge-based systems include various "knowledge" and data which has been acquired from a variety of sources, individuals and/or experts having a respectively high degree of knowledge in solving, answering and performing the types of problems, questions or tasks posed to the system. The knowledge and data is typically manifested in various rules, principles and guidelines which may include both "opinion" type rules and parameters, and other more irrefutable or "proven" type expert rules and parameters.

While these types of knowledge-based expert systems allow engineering type problems and/or questions to be solved and/or answered in a relatively short period of time and with relatively accurate results, they do not always provide the best solution or answer to the problem or question posed to the system. For example and without limitation, since some of the knowledge, rules and/or guidelines within these systems are not "proven" or applicable to all of the problems or tasks posed to the system, they do not necessarily provide the best solution to a problem or performance of a task. As a result, users of these systems must often repeat the "problem-solving" or design process in order to ensure that the best solution or performance of a specific problem or task is provided, thereby decreasing the efficiency of the engineering and/or problem-solving process.

There is therefore a need to provide a method for utilizing a knowledge-based system which overcomes at least some of the various and previously delineated limitations of prior systems and methods, and which alters the body of knowledge held within the system based upon an evaluation of the output of the system.

SUMMARY OF THE INVENTION

It is a first object of the invention to provide a method for utilizing a knowledge-based system which overcomes at least some of the previously delineated limitations of prior knowledge-based systems.

It is a second object of the invention to provide a method for utilizing a knowledge-based system which alters the body of knowledge within the system based upon an evaluation of the output of the system.

It is a third object of the invention to provide a method for utilizing a knowledge-based system which improves the ability of the system to accurately solve problems inputted into the system.

According to a first aspect of the present invention, a method is provided for utilizing an knowledge-based system having a body of knowledge. The method includes the steps of: inputting a task into the knowledge-based system, effective to cause the knowledge-based system to perform the task and provide an output; evaluating the output of the knowledge-based system to determine how well the knowledge-based system performed the task; and altering the body of knowledge based upon the evaluation, thereby improving the performance of the knowledge-based system.

According to a second aspect of the present invention, a method is provided for improving the performance of a knowledge-based system which provides a solution to a problem inputted into the system by use of a database of knowledge held within the system. The method includes the steps of: inputting a problem into the system, thereby causing the system to provide an output; evaluating the output of the system; determining whether portions of the database of knowledge were incorrect based upon the evaluation; and selectively removing the portions which were incorrect from the database of knowledge, thereby improving the performance of the knowledge-based system.

These and other objects, aspects, features, and advantages of the present invention will become apparent from a consideration of the following specification and the attached drawings.

DETAILED DESCRIPTION OF THE PREFERRED EMBODIMENT OF THE INVENTION

Figure 1:
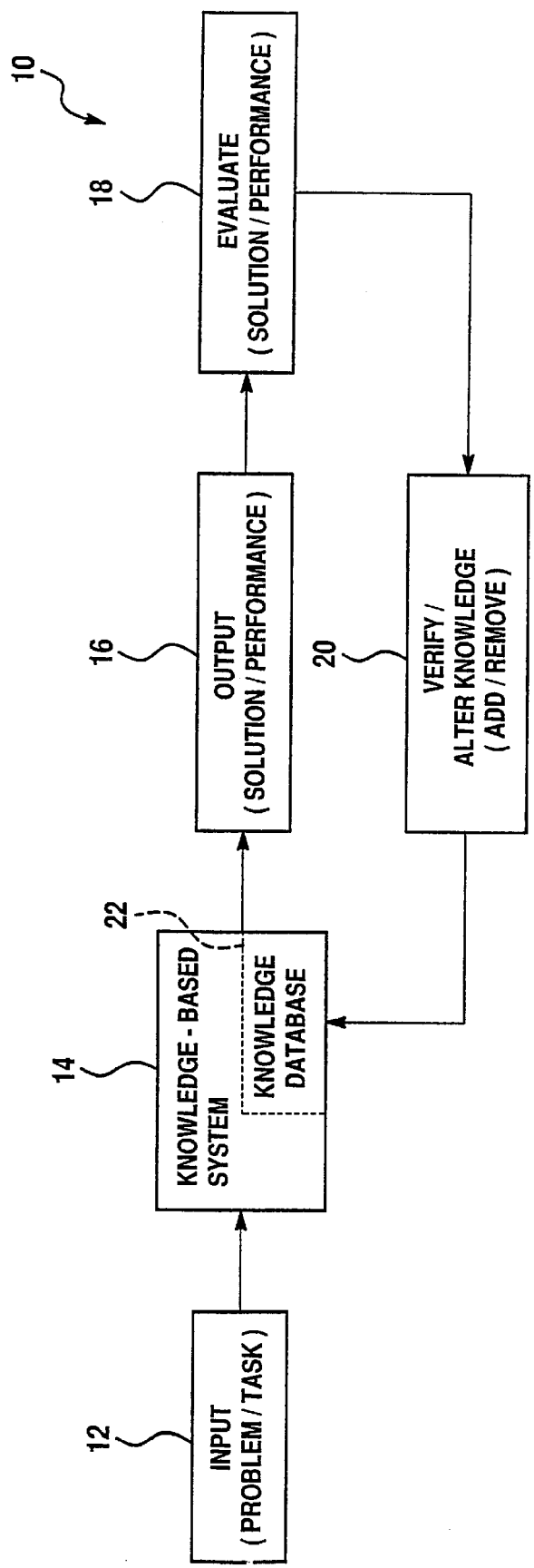
FIG. 1 is a block diagram illustrating a method for utilizing a knowledge-based expert system which is performed in accordance with the teachings of a preferred embodiment of the present invention.

Referring now to FIG. 1, there is shown a method for utilizing a knowledge-based expert or engineering system 14 and which is performed in accordance with the teachings of the preferred embodiment of the present invention. In the preferred embodiment of the invention, knowledge-based system 14 is designed to solve, perform, evaluate, and/or answer, technical and/or engineering type problems, tasks and questions, such as issues and tasks relating to the design, development and production of automotive vehicles, vehicle systems and vehicle components. It should be realized that in other alternate embodiments, knowledge-based system 14 can be used to solve, perform, answer and/or evaluate other types of questions, problems and tasks.

In the preferred embodiment of the invention, knowledge-based system 14 includes and/or is embodied within a conventional computer system that includes a memory unit, one or more software components, and one or more microprocessors which cooperatively operate the software components and perform the expert analysis, problem-solving, evaluation, and other processes of the knowledge-based system. Knowledge-based system 14 further includes a body or database 22 of expert knowledge. Particularly, the database includes information, guidelines, rules and parameters which have been obtained from a variety of sources or experts in a particular field or area (e.g., automotive design, development and engineering). The information, guidelines, rules and parameters within database 22 include both "opinion" or unproven type rules and guidelines, and proven or "irrefutable" rules and guidelines.

In step or block 12 of method 10, an engineering problem, question, task or design is communicated or inputted into the knowledge-based system 14. In the preferred embodiment, the input 12 is communicated to the knowledge-based system by use of a conventional user interface or input device (e.g., a keyboard, mouse, disk drive, modem, computer network or other data input device or method). Knowledge-based system 14 receives the input 12 and analyzes, performs and/or evaluates the problem or task by use of the expert body of knowledge (e.g., the rules, guidelines and/or parameters) held within database 22. In the preferred embodiment of the invention, the knowledge-based system 14 is run interactively by a user.

In block or step 16, the knowledge-based system 14 provides an output or "solution" to the inputted problem 12 or performs the inputted task 12. In the preferred embodiment of the invention, the knowledge-based system 14 provides the output 16 in electronic form by use of a conventional output device or method (e.g., a display, printer, or within a computer file). In block or step 18, the output 16 or performance of the knowledge-based system is evaluated. Particularly, the user and/or users of the knowledge-based system 14 determine how well the expert knowledge within system 14 performed the task or solved the problem inputted into the system. In the preferred embodiment, step 18 is performed by determining which of the knowledge 22 (e.g., rules, guidelines, parameters) was used in solving/performing the problem/task, by testing the output 16 under actual conditions, and determining which of the knowledge used by the system properly achieved or performed its respective desired objective and which of the knowledge or opinion did not properly achieve or perform its respective desired objective.

In step 20, "feedback" is provided to knowledge-based system 14 (e.g., the body of expert knowledge 22). Based upon the evaluation performed in step 18, the knowledge used to perform the inputted task and/or solve the inputted problem is either verified or altered. Particularly, if the evaluation and/or testing of output 16 indicates that any of knowledge or opinion (e.g., rules, guidelines, parameters) used to solve/perform the problem/task was "correct" or achieved its desired objective (e.g., solved/performed the problem/task properly), that knowledge is verified and is left within the expert body of knowledge 22. However, if the evaluation and/or testing of the output 14 indicates that any of the knowledge or opinion was "incorrect" or did not achieve its desired objective (e.g., did not solve/perform the problem/task properly), that knowledge or opinion is removed from the database 22. Additionally, knowledge may be added to database 22. Particularly, certain areas or issues of the problem/task which were not addressed by the knowledge-based system are identified, and data or knowledge corresponding to these issues is selectively added to the body of knowledge 22, thereby further improving the performance of the system.

In this manner, it should be appreciated that the present method 10 for utilizing the knowledge-based expert system 14 continuously improves the accuracy and quality of the output 16 of the system 14. Particularly, by evaluating how well the knowledge solves/performs a problem/task and verifying and/or altering the knowledge based upon the evaluation, the present method removes incorrect or unproven "opinion" type rules, guidelines, and parameters and leaves only verified knowledge within the system, thereby continuously improving the performance of the system with each use of the system.

It should be understood that Applicant's invention is not limited to the exact method 10 illustrated in FIG. 1, but that various changes and/or modifications may be made without departing from the spirit and/or the scope of Applicant's invention. For example, in other embodiments of Applicant's invention, additional or different steps and procedures may be undertaken to further improve the performance of system 14.

What is claimed is:

1. A method for utilizing a knowledge-based system having a body of knowledge, said method comprising the steps of:

inputting a task into the knowledge-based system, effective to cause the knowledge-based system to perform said task and provide an output;

evaluating said output of said knowledge-based system to determine how well said knowledge-based system performed said task by testing said output under actual conditions and determining which portions of said body of knowledge produce accurate results and which portions of said body of knowledge produce inaccurate results; and altering said body of knowledge based upon said evaluation by removing portions of said body of knowledge which produce said inaccurate results, thereby improving said performance of said knowledge-based system.

2. The method of claim 1 wherein said knowledge-based system utilizes a portion of said body of knowledge to perform said task, said method further comprising the steps of:

identifying said portion of said body of knowledge which was used to perform said task;

determining whether said portion of said body of knowledge performed said task properly; and selectively removing said portion from said body of knowledge based upon said determination.

3. The method of claim 2 further comprising the steps of:

identifying issues which were not addressed by said knowledge-based system; and adding data to said body of knowledge corresponding to said identified issues, thereby further improving said performance of said knowledge-based system.

4. The method of claim 3 wherein said knowledge-based system comprises a computer system.

5. The method of claim 4 wherein said body of knowledge is stored within a database within said computer system.

6. The method of claim 5 wherein said task comprises an engineering problem.

7. The method of claim 5 wherein said task is related to the design of an automotive component.

8. A method for improving the performance of a knowledge-based system which provides a solution to a problem inputted into said system by use of a database of knowledge within said system, said method comprising the steps of:

inputting a problem into said system, thereby causing said system to provide an output;

evaluating said output of said system;

determining whether portions of said database of knowledge were incorrectly based upon said evaluation; and selectively removing said portions which were incorrect from said database of knowledge, thereby improving said performance of said knowledge-based system.

9. The method of claim 8 further comprising the steps of:

adding data to said database of knowledge based upon said evaluation, said data corresponding to issues which were not addressed by said knowledge-based system.

10. The method of claim 9 wherein said database of knowledge comprises a plurality of rules obtained from experts.

11. The method of claim 10 wherein said database of knowledge is resident within a computer system.

12. The method of claim 11 wherein said computer system comprises a display for viewing said output.

13. A method for utilizing a knowledge-based system comprising the steps of:

providing input to said knowledge-based system, effective to cause said system to generate an output;

evaluating said output by testing said output and comparing a result of said testing with said output; and providing feedback to said knowledge-based system based upon said evaluation, said feedback being effective to alter a body of knowledge which is held within said knowledge-based system by removing portions of said body of knowledge which are inaccurate, thereby improving said knowledge-based system.

14. The method of claim 13 wherein said feedback is effective to selectively remove at least a portion of said body of knowledge from said knowledge-based system.

15. The method of claim 14 wherein said feedback is effective to selectively add a portion of knowledge to said body of knowledge.

16. The method of claim 15 wherein said input comprises a task and said evaluation is effective to determine how well said knowledge-based system performs said task.

17. The method of claim 15 wherein said input comprises a problem, wherein said output comprises a solution, and wherein said evaluation is effective to determine whether said solution is correct.

18. The method of claim 17 wherein said problem comprises an automotive engineering type problem.

* * * * *